No. 787,311. Patented April 11, 1905.

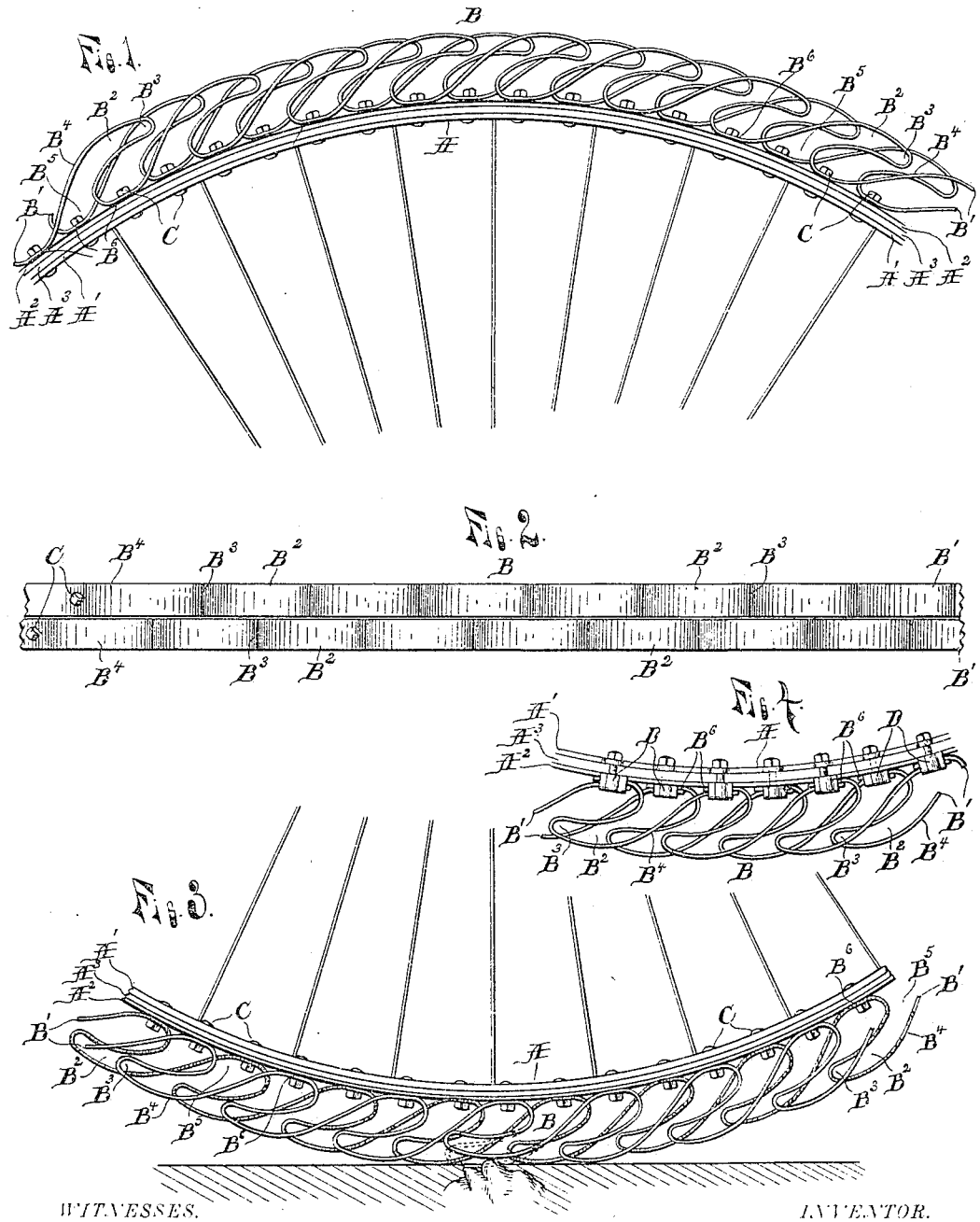

UNITED STATES PATENT OFFICE.

ELBRIDGE A. SCRIBNER, OF DETROIT, MICHIGAN, ASSIGNOR OF ONE-FIFTH TO JOHN W. KREKELER, ONE-FIFTH TO WILLIAM W. WALTERS, ONE-FIFTH TO ROBERT W. JEAN, AND ONE-FIFTH TO FREDERICK S. ROSS, OF DETROIT, MICHIGAN.

TIRE FOR VEHICLE-WHEELS.

SPECIFICATION forming part of Letters Patent No. 787,311, dated April 11, 1905.

Application filed March 25, 1904. Serial No. 199,938.

*To all whom it may concern:*

Be it known that I, ELBRIDGE A. SCRIBNER, a citizen of the United States of America, residing at Detroit, in the county of Wayne and State of Michigan, have invented certain new and useful Improvements in Tires for Vehicle-Wheels, of which the following is a specification, reference being had therein to the accompanying drawings.

This invention relates to improvements in resilient tires for vehicle and other wheels; and its object is to provide a cheap, compact, and sightly metal tire formed of spring members so constructed and arranged that the same cushioning effect is obtained as by the use of a pneumatic tire and the liability of breaking under a heavy load reduced to the minimum and also to provide means for deadening the noise by preventing the transmission of the vibrations of said springs.

To this end the invention consists in securing to the wheel-rim two series of flexible members, each member being adapted to operate independently of the others and to directly contact the ground, forming the tread of the wheel, and the two series or rows being arranged side by side with the members in one row in staggered relation to those of the other row to form a substantially continuous and smooth tread; and the invention consists also in the particular form of spring-loop whereby an outer substantially flat surface is presented to the ground and whereby the springs will support each other under a heavy load.

The invention further consists in interposing a strip of resilient or fibrous material between inner and outer strips forming the wheel-rim to which the spring members are attached to prevent the transmission of the vibrations of the springs to the wheel and in providing certain other new and useful features and the particular arrangement and construction of parts, all as hereinafter more fully described, and shown in the accompanying drawings, in which—

Figure 1 is a side elevation of a portion of a wheel rim and tire embodying the invention; Fig. 2, a plan or face view of the same; Fig. 3, a view similar to Fig. 1, illustrating the operation of the spring members; and Fig. 4 is a view showing a modification in the construction.

As shown in the drawings, A is the wheel-rim, consisting of an inner strip $A'$, to which the spokes are secured in any suitable manner, and an outer strip $A^2$, with a strip $A^3$ of resilient or fibrous material, as rubber belting or similar material, between.

The tire B consists of two strips of steel $B'$, each bent into a series of long narrow spring-loops $B^2$, each loop extending outward from the rim and bent toward its adjacent loop, with its closed end $B^3$ near the inclined side $B^4$ of said adjacent loop and its open end $B^5$ toward the rim, to which it is attached by bolts C passing through the straight portions $B^6$ connecting the loops. These loops thus form spring-fingers all inclined in the same direction, and their curved sides $B^4$ by reason of the curve of the fingers are brought to the periphery of the tire and form the tread. The two strips $B'$ are secured to the rim in parallelism, with their adjacent edges in close proximity and so that the loops of one strip will lie opposite the spaces between those of the other strip, and therefore the sides $B^4$ of the loops of both strips together form a practically continuous flat tread, yet each loop is free to bend entirely independent of the others, and as the wheel rolls over the ground or comes in contact with any projection or obstruction the tire will yield freely at the particular point of contact, and thus has the same cushion effect as a pneumatic tire. The loops being long and narrow and bent rearwardly in the plane of rotation of the wheel form excellent springs giving the greatest resiliency with the least amount of breaking strain, as there are no sharp bends and one side of each loop supports the other, and as the closed end of each loop normally lies in such a position that when the loop is compressed said end will contact the side of the next loop each loop is reinforced or supported under heavy load by the adjacent loop, as shown in Fig. 3. The wheel is preferably run so that the direction in which the loops extend will be opposite to the direction of movement of the rim, and therefore the loops will not dig into the earth; but at the same time by reason of the independent flexure of the loops the wheel will take a much firmer hold on the ground than any tire having a continuous tread.

By placing the resilient strip $A^3$ between the inner and outer strips forming the rim the vibrations of the loops or springs are prevented from being transmitted to the inner strip and spokes, and therefore the noise caused by such vibrations will be greatly reduced.

As shown in Fig. 4, the strips B', forming the springs, may be secured to the rim by clamps D instead of by bolts passing through the strips and rim, and, as shown in this figure, the strips may be made in sections with one loop to a section, or it is evident that they may be formed of two or more sections having several loops.

Having thus fully described my invention, what I claim is—

1. The combination with a wheel-rim, of a series of spring members each formed of a strip of spring metal bent in the form of a loop extending outward from the rim with its ends secured thereto and said loop bent rearwardly in the plane of rotation of the wheel toward the convex outer side of the adjacent loop, which convex sides form the tread of the wheel and the concave inner sides form spring-supports for the tread.

2. The combination of a wheel-rim formed of an inner and an outer strip and a strip of resilient material between, a series of spring-loops secured at their inner open ends to said rim and all bent rearwardly in the plane of rotation of the wheel in one direction, each with its closed outer end above the inclined side of the adjacent loop, the said inclined sides forming the tread of the tire, and means for securing the loops to the rim.

3. The combination with a wheel-rim, of parallel strips bent to form a series of elongated loops to extend outward from the rim in the plane of rotation of the wheel and all bent in one direction to overlap each other, each with its closed and rounded outer end above the inclined side of the adjacent loop and having integral flat portions connecting the loops, and means for securing the strips to the rim engaging the flat portions and with the loops of one strip alternating with the spaces between the loops of the other strip to form a continuous tread.

In testimony whereof I affix my signature in presence of two witnesses.

ELBRIDGE A. SCRIBNER.

Witnesses:
   OTTO F. BARTHEL,
   LEWIS E. FLANDERS.